United States Patent
Lawrenson et al.

(10) Patent No.: US 9,662,517 B2
(45) Date of Patent: May 30, 2017

(54) CHEMICAL OXYGEN GENERATOR

(71) Applicant: AVOX SYSTEMS, INC., Lancaster, NY (US)

(72) Inventors: Christopher C. Lawrenson, Williamsville, NY (US); Matthew D. Gates, Cheektowaga, NY (US); Kurt L Jandzinski, Depew, NY (US); William A. Mack, Youngstown, NY (US)

(73) Assignee: Avox Systems, Inc., Lancaster, NY (US)

( * ) Notice: Subject to any disclaimer, the term of this patent is extended or adjusted under 35 U.S.C. 154(b) by 457 days.

(21) Appl. No.: 13/865,367

(22) Filed: Apr. 18, 2013

(65) Prior Publication Data

US 2013/0280514 A1    Oct. 24, 2013

Related U.S. Application Data

(60) Provisional application No. 61/635,337, filed on Apr. 19, 2012.

(51) Int. Cl.
| | |
|---|---|
| *A62B 7/08* | (2006.01) |
| *A62B 21/00* | (2006.01) |
| *B29C 43/00* | (2006.01) |
| *C01B 13/02* | (2006.01) |

(52) U.S. Cl.
CPC ............ *A62B 21/00* (2013.01); *B29C 43/006* (2013.01); *C01B 13/0296* (2013.01); *Y10T 428/249924* (2015.04); *Y10T 428/2933* (2015.01)

(58) Field of Classification Search
CPC ............................. A62B 21/00; B29C 43/006
USPC ..................................... 422/120, 126
See application file for complete search history.

(56) References Cited

U.S. PATENT DOCUMENTS

| | | | | |
|---|---|---|---|---|
| 3,516,797 | A | * | 6/1970 | Bovard ................. A62B 21/00 102/530 |
| 3,542,522 | A | * | 11/1970 | Mausteller .................... 422/122 |
| 3,955,931 | A | * | 5/1976 | Thompson ............... A62B 7/08 128/202.26 |
| 4,981,655 | A | | 1/1991 | Kolbe et al. |
| 5,338,516 | A | | 8/1994 | Zhang et al. |
| 5,443,798 | A | | 8/1995 | Kerrebrock |
| 5,725,834 | A | | 3/1998 | Nishii et al. |
| 6,143,196 | A | | 11/2000 | Zhang et al. |

(Continued)

FOREIGN PATENT DOCUMENTS

| | | |
|---|---|---|
| CN | 102412400 | 4/2012 |
| GB | 16693 | 0/1911 |

(Continued)

OTHER PUBLICATIONS

PCT/US2013/037074, International Search Report and Written Opinion dated Apr. 30, 2014, 14 pages.

(Continued)

*Primary Examiner* — Kevin Joyner
(74) *Attorney, Agent, or Firm* — Kilpatrick Townsend & Stockton LLP; Dean W. Russell; Anthony L. Guebert

(57) ABSTRACT

A chemical oxygen generator with enhanced structural integrity. In some embodiments, the chemical core of the chemical oxygen generator is reinforced with one or more reinforcing structures that are integral with the core. In some embodiments, as the core burns, the one or more reinforcing structures become fused with the core.

24 Claims, 4 Drawing Sheets

(56) References Cited

U.S. PATENT DOCUMENTS 6,193,907 B1    2/2001    Zhang et al.
7,494,624 B2 *  2/2009    Crudace et al. .............. 422/120

FOREIGN PATENT DOCUMENTS

| GB | 304292 | 3/1931 |
| GB | 1394588 | 5/1975 |
| WO | 9218423 | 10/1992 |

OTHER PUBLICATIONS

PCT/US2013/037074, International Search Report and Written Opinion dated Oct. 30, 2014, 8 pages.
Chinese Patent Application No. 201380020684.5, First Office Action and Search Report dated Feb. 2, 2016, 15 pages (English translation provided).
Form PCT/ISA/206 Annex to Invitation to Pay Additional Search Fees dated Jul. 8, 2013 in Application No. PCT/US2013/037074.

* cited by examiner

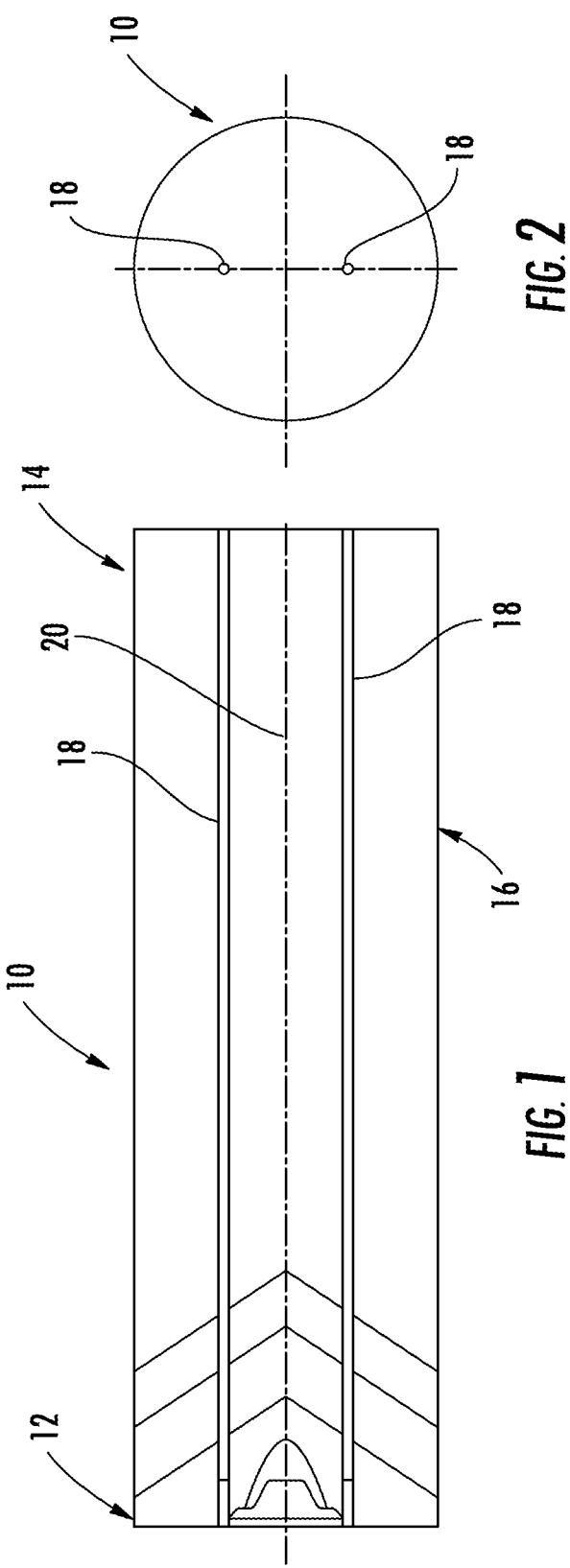

CHEMICAL OXYGEN GENERATOR

FIELD OF THE INVENTION

This application claims the benefit of U.S. Provisional Application Ser. No. 61/635,337 filed Apr. 19, 2012 and titled "Chemical Oxygen Generator with Reinforced Chemical Core," the contents of which are incorporated herein by reference.

FIELD OF THE INVENTION

Embodiments of the invention generally relate to chemical oxygen generators.

BACKGROUND OF THE INVENTION

Chemical oxygen generators generate oxygen by way of a chemical reaction and are used in a variety of applications and industries, including but not limited to aircraft, breathing apparatus for firefighters and mine rescue crews and the like, submarines, and any application where a compact emergency oxygen generator is needed. In some cases, the chemical oxygen generator generates oxygen by burning a chemical oxygen core. As the core ignites, the powder or other substance inside the core burns, turns to liquid and then re-solidifies. In this way, the burning core includes a solid, unspent core at a distal end, a re-solidified spent core at the proximal end, and a molten burn front in between the two ends. The molten portion of the core is of low structural integrity and thus is susceptible to damage when exposed to vibration or other forces during operation.

Attempts have been made to maintain the integrity of the chemical oxygen generator during operation and vibration by externally packaging the core, for example by wrapping the core in an external stainless mesh wrap, and/or by thermally insulating the core. However, these approaches limit the composition of the core to a subset of usable chemicals based on their mechanical properties and also add cost and weight.

SUMMARY OF THE INVENTION

The terms "invention," "the invention," "this invention" and "the present invention" used in this patent are intended to refer broadly to all of the subject matter of this patent and the patent claims below. Statements containing these terms should not be understood to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to the entire specification of this patent, all drawings and each claim.

In certain embodiments, there is provided a chemical oxygen generator with a reinforced chemical core that provides high structural integrity to the generator. In some embodiments, the core includes one or more reinforcing structures that extend through the core and are integral with the core. In some embodiments, as the core burns, the one or more reinforcing structures become fused with the core.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the following appended figures, in which use of like reference numerals in different features is intended to illustrate like or analogous components.

FIG. 1 is a side cross-sectional view of a pressed chemical oxygen core according to one embodiment.

FIG. 2 is an end view of the chemical oxygen core of FIG. 1.

DETAILED DESCRIPTION OF THE DRAWINGS

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 3:
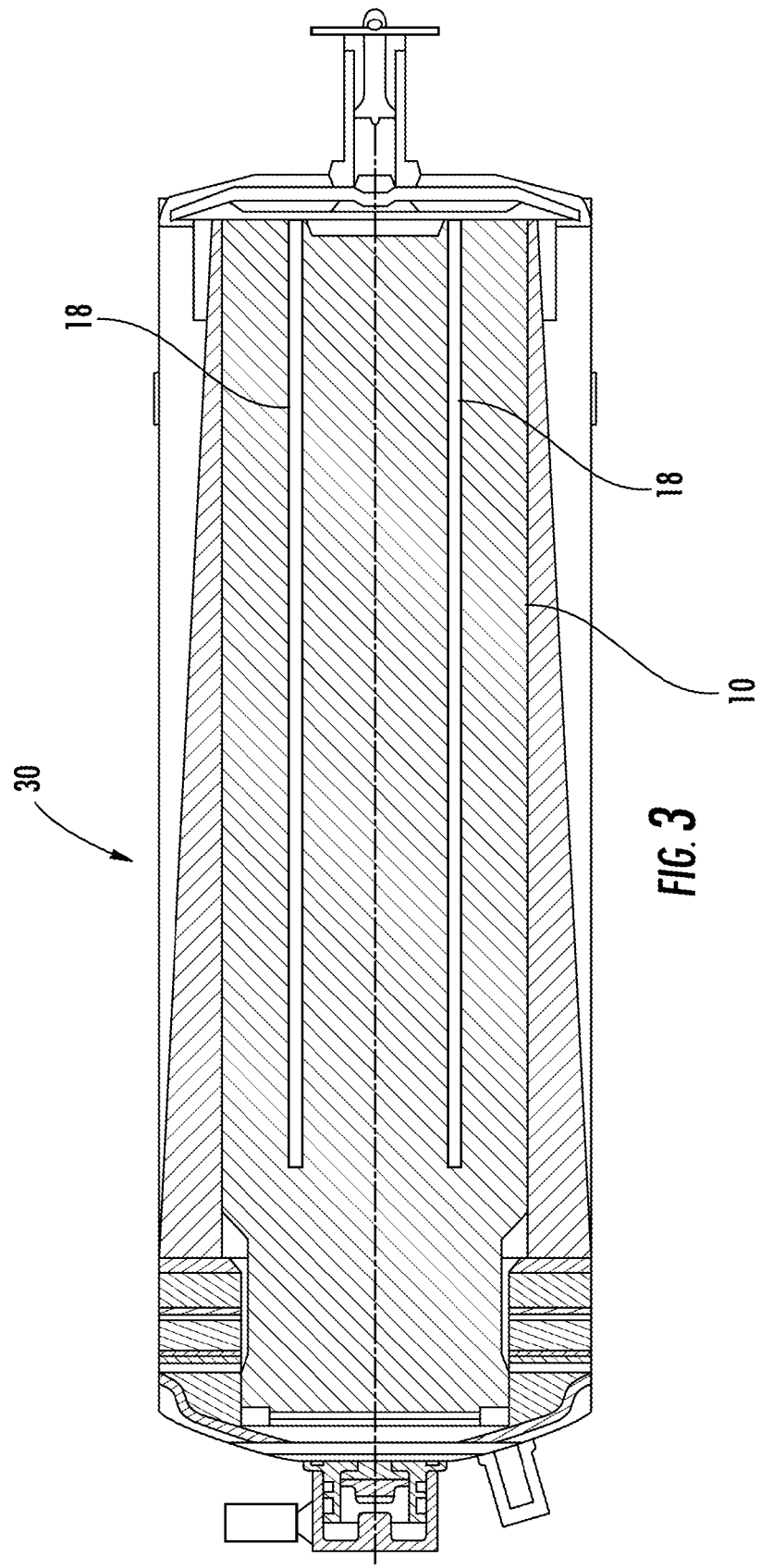
FIG. 3 is a cross-sectional view of a chemical oxygen generator according to one embodiment.
Figure 4:
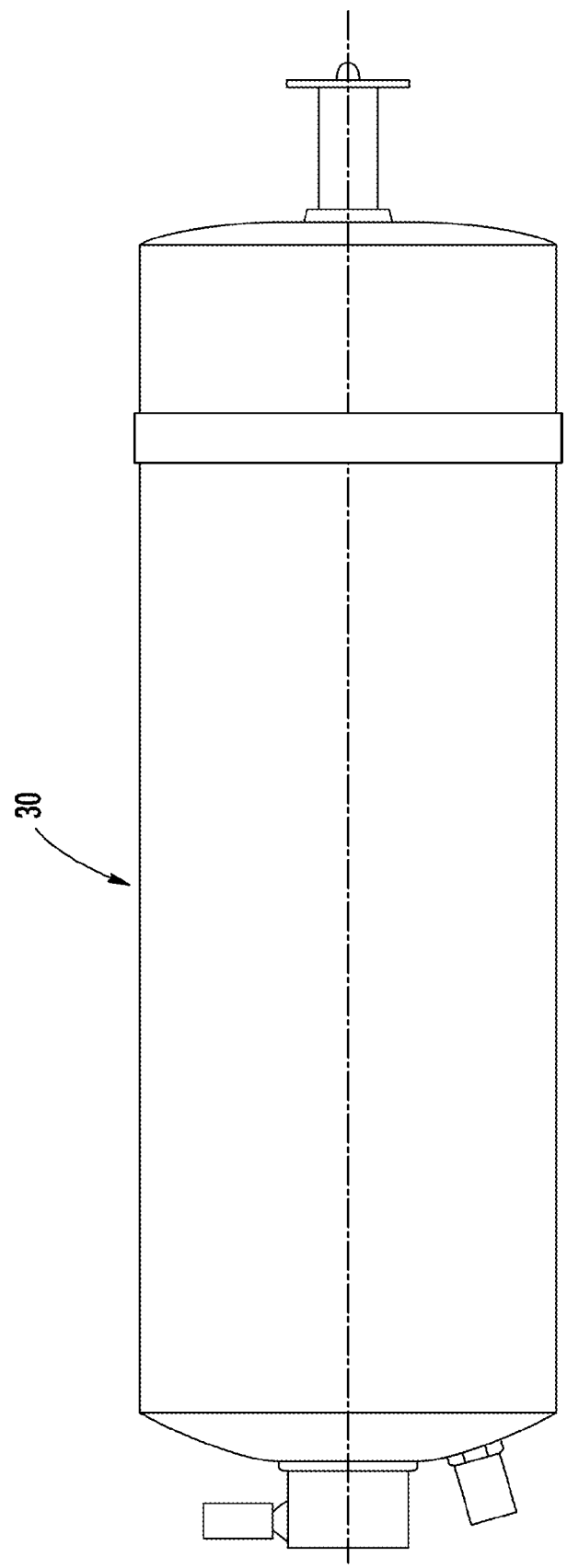
FIG. 4 is a side elevation view of the chemical oxygen generator of FIG. 3.

Disclosed herein are chemical oxygen generators with reinforced chemical cores. In particular, the chemical cores include at least one reinforcing structure that is integral with the inside of the chemical core. FIG. 1 illustrates a non-limiting embodiment of a chemical core 10 that may be used in any suitable chemical oxygen generator, such as but not limited to generator 30 shown in FIGS. 3-4. As shown in FIG. 1, one or more reinforcing structures 18 may extend at least partially through the core 10. In some embodiments, the one or more reinforcing structures 18 are generally parallel to a longitudinal axis 20 of the core 10, while in other embodiments, the one or more reinforcing structures may extend at any suitable angle from the longitudinal axis 20. If more than one reinforcing structure 18 is used, the one or more reinforcing structures 18 may be generally parallel to one another, although they need not be. The one or more reinforcing structures 18 may extend generally across the length of the core 10 as shown in FIG. 1, although they need not extend completely across the length of the core 10, as shown for example in FIG. 3. Any suitable reinforcing structure (such as, but not limited to, rods, cones, tubes, U-shaped sections of a rod, pieces of an arbitrary shape, etc.) may be used.

The one or more reinforcing structures 18 may be formed of metal, such as but not limited to, stainless steel, nickel, or any other suitable metal. In other embodiments, the one or more reinforcing structures may be formed of ceramic or any other suitable material that is not consumed during the burn process. In other words, the one or more reinforcing structures 18 have a melting point that is greater than the melting point of the chemical core 10. In one non-limiting embodiment, the one or more reinforcing structures 18 are anchored in the solid, unspent core at a distal end 14 and are also anchored in the re-solidified spent core at the proximal end 12, as described below. Because the core is molten in a molten region 16 at a burn front in between the two ends as the core burns, the molten region 16 itself has limited to no structural integrity. The one or more reinforcing structures 18 provide additional integrity in between the two ends of the core 10 and allow the core to burn properly during vibration.

In some embodiments, the core is initially composed of powder or other suitable substance that is used in the chemical process to generate oxygen. When forming the core 10, the one or more reinforcing structures 18 may be inserted into the powder before the core 10 (and the powder or other substance contained within the core) is pressurized. Once subjected to sufficient pressure, the particles of the powder or other structure contained within the core adhere to one another and also adhere to the one or more reinforcing structures 18. As such, after the core 10 is pressed, the one or more reinforcing structures 18 become integral with the core much like a wick is integral with a candle.

Figure 5:
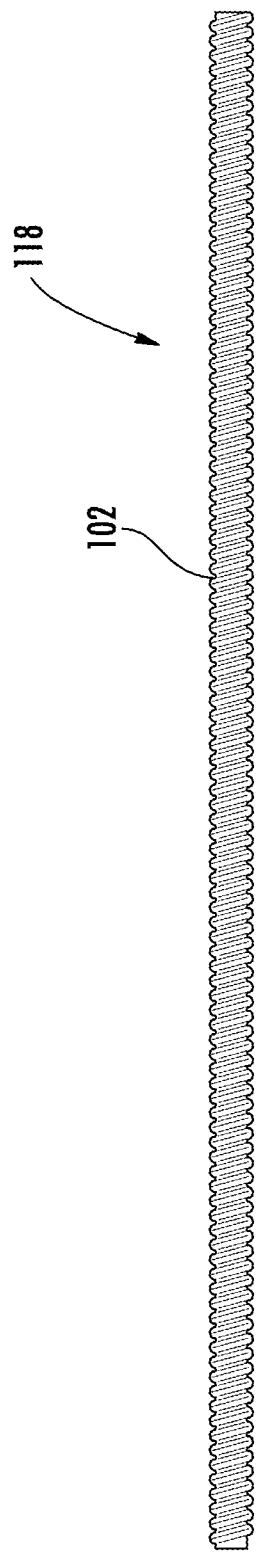
FIG. 5 is a plan view of a reinforcing structure according to one embodiment.

In some embodiments, the one or more reinforcing structures may be threaded or have grooves or other texture that further lock each reinforcing structure in place with respect to the core when pressed. FIG. 5 shows a non-limiting embodiment of a reinforcing structure 118 having threads 102.

As the core 10 burns, the powder within the core 10 turns to liquid. Proximal end 12, which is the ignition end, burns first while the distal end 14 initially remains in a solid, unburned state. As the burn front moves from the proximal end 12 to the distal end 14, the liquid re-hardens around the one or more reinforcing structures 18 and fuses with the one or more reinforcing structures 18. As previously stated, in between the burned sections and unburned sections, there is a gap between the ends of the core where the core is in a molten state, which, without the presence of the one or more reinforcing structures 18, would make the core structurally unstable. Because, however, the one or more reinforcing structures 18 are an integral part of the core 10 and become fused with the core 10 after burning, the one or more reinforcing structures 18 help maintain the structural integrity between the burned and unburned sections of the core 10 during operation.

The foregoing is provided for purposes of illustrating, explaining, and describing embodiments of the present invention. Further modifications and adaptations to these embodiments will be apparent to those skilled in the art and may be made without departing from the scope or spirit of the invention. For example, other ways of reinforcing the inside of the chemical core are envisioned. As one non-limiting example, the inside of the chemical core could be reinforced with a wire cloth, threaded or unthreaded non-rods (e.g., cones, tubes, etc.), U-shaped sections of a threaded or unthreaded rod, or with pieces of metal of an arbitrary shape, or with any other suitable structure. Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

We claim:

1. A chemical oxygen generator comprising:
    a unitary chemical core for generating oxygen; and
    at least one elongate member that extends at least partially through the unitary chemical core, wherein a first end of the at least one elongate member is embedded within the unitary chemical core at a proximal end of the unitary chemical core and a second end of the at least one elongate member is embedded within the unitary chemical core at a distal end of the unitary chemical core that is opposite the proximal end, and wherein the at least one elongate member comprises a continuous surface that extends from approximately the proximal end to approximately the distal end of the unitary chemical core.

2. The chemical oxygen generator of claim 1, wherein the at least one elongate member is integral with the unitary chemical core.

3. The chemical oxygen generator of claim 1, wherein the at least one elongate member extends generally parallel to a longitudinal axis of the unitary chemical core.

4. The chemical oxygen generator of claim 1, wherein at least one elongate member comprises threads or grooves.

5. The chemical oxygen generator of claim 1, wherein the at least one elongate member is formed of metal or ceramic.

6. The chemical oxygen generator of claim 1, wherein a melting point of the at least one elongate member is greater than a melting point of the unitary chemical core.

7. The chemical oxygen generator of claim 1, wherein the unitary chemical core comprises powder and the powder is adhered to the at least one elongate member.

8. The chemical oxygen generator of claim 1, wherein the continuous surface of the at least one elongate member is rigid and structurally supports the unitary chemical core.

9. The chemical oxygen generator of claim 1, wherein the at least one elongate member is adhered directly to at least a portion of the unitary chemical core that generates oxygen.

10. The chemical oxygen generator of claim 9, wherein the portion of the unitary chemical core that generates oxygen surrounds at least a portion of an outer surface of the at least one elongate member.

11. A unitary oxygen-generating chemical core comprising at least one unitary reinforcing structure that extends through the unitary oxygen-generating chemical core and that is integral with the unitary oxygen-generating chemical core, wherein a melting point of the at least one reinforcing structure is greater than a melting point of the unitary oxygen-generating chemical core, wherein a first end of the at least one unitary reinforcing structure is embedded within an ignition end of the unitary oxygen-generating chemical core and a second end of the at least one unitary reinforcing structure is embedded within a distal end of the unitary oxygen-generating chemical core that is opposite the ignition end, wherein the at least one reinforcing structure comprises a rigid continuous surface that extends from the ignition end to the distal end of the unitary oxygen-generating chemical core.

12. The unitary oxygen-generating chemical core of claim 11, wherein the at least one unitary reinforcing structure comprises one or more rods.

13. The unitary oxygen-generating chemical core of claim 11, wherein the at least one unitary reinforcing structure comprise grooves or threads.

14. The unitary oxygen-generating chemical core of claim 11, wherein the at least one unitary reinforcing structure extends generally parallel to a longitudinal axis of the unitary oxygen-generating chemical core.

15. The unitary oxygen-generating chemical core of claim 11, wherein the at least one unitary reinforcing structure generally extends throughout a length of the unitary oxygen-generating chemical core.

16. The unitary oxygen-generating chemical core of claim 11, wherein the at least one unitary reinforcing structure fuses with the unitary oxygen-generating chemical core as the unitary oxygen-generating chemical core burns.

17. The unitary oxygen-generating chemical core of claim 11, wherein the at least one unitary reinforcing structure is formed of metal or ceramic.

18. The unitary oxygen-generating chemical core of claim 11, wherein the at least one unitary reinforcing structure is rigid and structurally supports the unitary oxygen-generating chemical core.

19. The unitary oxygen-generating chemical core of claim 11, wherein the at least one unitary reinforcing structure is adhered directly to at least a portion of the unitary oxygen-generating chemical core configured to generate oxygen.

20. The unitary oxygen-generating chemical core of claim 19, wherein the portion of the unitary oxygen-generating chemical core configured to generate oxygen surrounds at least a portion of an outer surface of the at least one unitary reinforcing structure.

21. A chemical oxygen generator comprising:
an oxygen-generating chemical core; and
at least one elongate member that extends at least partially through the oxygen-generating chemical core,
wherein a first end of the at least one elongate member is embedded within the oxygen-generating chemical core at a proximal end of the oxygen-generating chemical core and a second end of the at least one elongate member is embedded within the oxygen-generating chemical core at a distal end of the oxygen-generating chemical core that is opposite the proximal end,
wherein at least a portion of the oxygen-generating chemical core that generates oxygen surrounds at least a portion of the at least one elongate member, and
wherein the at least one elongate member comprises a continuous surface that extends from approximately the proximal end to approximately the distal end of the oxygen-generating chemical core.

22. The chemical oxygen generator of claim 21, wherein the portion of the oxygen-generating chemical core that generates oxygen is adhered directly to at least part of an outer surface of the at least one elongate member.

23. The chemical oxygen generator of claim 21, wherein the oxygen-generating chemical core is a unitary structure.

24. The chemical oxygen generator of claim 21, wherein the oxygen-generating chemical core comprises powder and the powder is adhered to the at least one elongate member.

* * * * *